United States Patent Office.

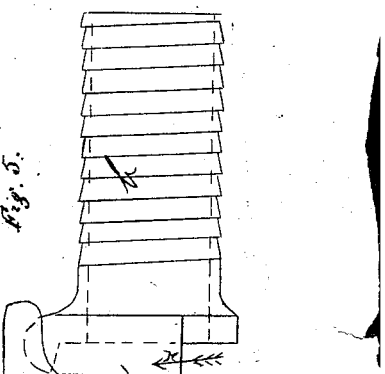
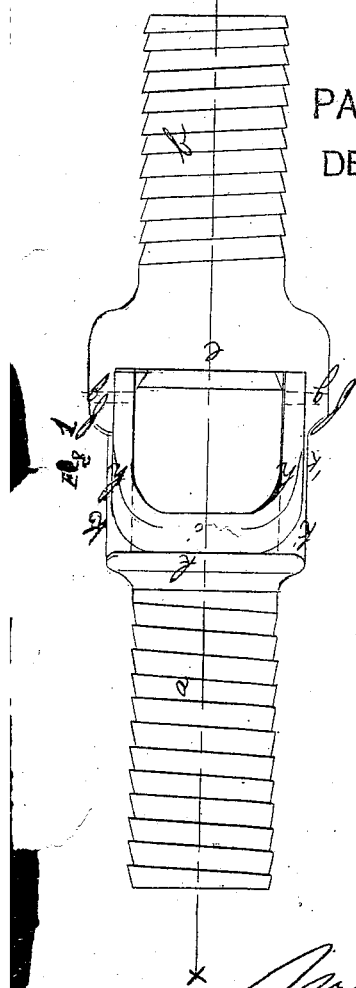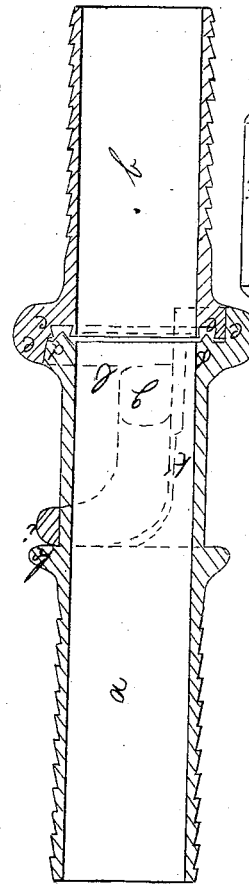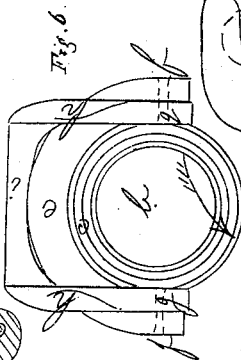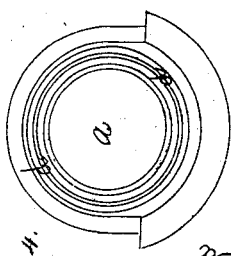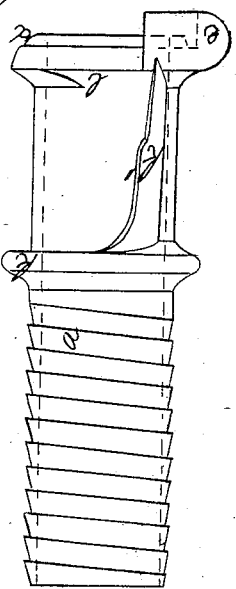

NATHAN THOMPSON, OF BROOKLYN, NEW YORK.

Letters Patent No. 72,565, dated December 24, 1867.

IMPROVED HOSE-COUPLING.

*The Schedule referred to in these Letters Patent and making part of the same.*

TO ALL WHOM IT MAY CONCERN:

Be it known that I, NATHAN THOMPSON, a citizen of the United States, at present residing in the city of Brooklyn, and State of New York, have invented a new and useful Improvement in Couplings; and that the following, taken in connection with the drawings, is a full, clear, and exact description thereof. In the drawings—

Figure 1 is an elevation of the whole coupling.

Figure 2 is a longitudinal section through the same.

Figure 3 is an elevation taken at right angles to the former elevation of one member of the coupling.

Figure 4 is an end view thereof.

Figure 5 is an elevation of the other member of the coupling with the locking-piece or cam attached; and Figure 6 is an end view thereof.

My present invention is based upon that for which Letters Patent of the United States were granted to me upon the 24th day of September, 1867, and is particularly designed for the coupling together of joints or lengths of flexible pipe or hose, and is designed to prevent accidental uncoupling when coupled lengths of hose are dragged along the ground or moved from place to place.

In the drawings, two short lengths of metal tubing to which hose can be attached, are shown at $a\,b$. These tubes may be notched, screwed, or otherwise recessed on the exterior, so that the hose may be firmly attached to them. Each length has a flange thereon, the one grooved to embrace a washer of leather, rubber, or other proper material, as at $c$, the other furnished with an elevation or projecting ring, as at $d$. Each tube is also furnished with a socket, $e\,e$, semi-cylindrical, or nearly so, whose chief offices are to protect the washer and to guide the two tubes into proper position for being locked together. To one of these tubes is secured by lugs $f$ and pivots $g$, a cam-locking piece, $h$, the said locking-piece consisting of two cams, two levers, and a connecting-piece, such as $i$, uniting the two levers, the whole, for the sake of cheapness and strength, being formed of one piece of metal. This locking-piece, as the drawings show, lies inside of the ears. The other tube is secured, or, as I prefer, formed in one piece with it, a guard or locking-piece protector, $k\,k'$. This guard is shown in the drawings partly as portion of a projecting ring or flange, partly as two ribs, $k'\,k'$, extending from the exterior of the socket upon $a$ to the ring thereon. This guard may be varied in shape, but the chief guide for its form must be the form of the locking-piece, and it should project from the tube $a$ sufficiently far to protect the locking-piece from accidental displacement by the action of stones, steps, or any irregularities of surface over which hose may be dragged. By the use of this guard I avoid objections to the employment of the coupling described in my former patent as a hose-coupling; the objection being that the couplings were loosened or detached by the rough usage to which coupled lengths of hose are subjected by firemen and others.

That surface of the flange upon $a$, which is farthest from the end thereof, as at $l$, is the surface upon which the cams of the locking-piece bear. In coupling the two parts together, the piece $a$ is shoved sidewise over the flange of the piece $b$, (see arrow $x$, fig. 5,) the part $l$ of the flange upon $a$, entering under the locking-cams, which are then in the position shown in black lines, fig. 5. When the socket on $a$ strikes the flange on $b$, the parts are in place, and the locking-piece is then lifted into the position shown in red lines, compressing the packing and locking the coupling fast, and the locking-piece is then protected from accidental displacement by the guard, (see figs. 1 and 2.) In order to uncouple, a hook with a cross-handle or a chisel-point is introduced between the guard and locking-piece, and used as a lever to move the locking-piece away from its locking position. I prefer to locate the washer in a groove dove-tailed in its cross-section, or in some other manner, to secure it from accidental displacement. The sockets may be used or dispensed with; I prefer to use them.

I claim as of my own invention—

The combination of a locking-piece, pivoted upon one member of a coupling, with a guard or protector attached to or making part of the other member thereof, the combination being substantially as described.

NATHAN THOMPSON.

Witnesses:
D. C. GRAHAM,
IRA V. GERMAIN.